(12) United States Patent
Kobayashi et al.

(10) Patent No.: US 11,746,221 B2
(45) Date of Patent: Sep. 5, 2023

(54) THERMOPLASTIC ELASTOMER COMPOSITION

(71) Applicant: ENEOS Materials Corporation, Tokyo (JP)

(72) Inventors: Masato Kobayashi, Minato-ku (JP); Ryoji Usui, Minato-ku (JP); Yuki Sato, Minato-ku (JP); Osamu Kose, Minato-ku (JP)

(73) Assignee: ENEOS Materials Corporation, Tokyo (JP)

( * ) Notice: Subject to any disclaimer, the term of this patent is extended or adjusted under 35 U.S.C. 154(b) by 0 days.

(21) Appl. No.: 17/865,562

(22) Filed: Jul. 15, 2022

(65) Prior Publication Data

US 2023/0041123 A1 Feb. 9, 2023

(30) Foreign Application Priority Data

Jul. 16, 2021 (JP) .................................. 2021-117716
Dec. 7, 2021 (JP) .................................. 2021-198222

(51) Int. Cl.
C08L 23/16 (2006.01)
C08L 23/08 (2006.01)
C08L 9/00 (2006.01)

(52) U.S. Cl.
CPC ............. *C08L 23/0815* (2013.01); *C08L 9/00* (2013.01); *C08L 2207/04* (2013.01)

(58) Field of Classification Search
CPC ...... C08L 2205/22; C08L 23/16; C08L 53/00; C08L 91/08; C08L 23/0815; C08L 2207/04; C08L 9/00
See application file for complete search history.

(56) References Cited

U.S. PATENT DOCUMENTS

2007/0077375 A1* 4/2007 Honda ...................... B32B 5/14
525/240
2019/0309151 A1* 10/2019 Datta ...................... C08L 23/16

FOREIGN PATENT DOCUMENTS

| EP | 1510549 A1 * | 3/2005 | ............. C08L 23/16 |
| EP | 1672023 A1 * | 6/2006 | ............. C08L 23/16 |
| EP | 2867296 A1 * | 5/2015 | ............. C08L 23/12 |
| JP | 2014-193969 A | 10/2014 | |
| JP | 2014190883 A * | 10/2014 | |
| JP | 2014193969 A * | 10/2014 | |

OTHER PUBLICATIONS

Extended European Search Report dated Nov. 28, 2022 in European Patent Application No. 22184887.2, 5 pages.

* cited by examiner

Primary Examiner — Mark S Kaucher
(74) Attorney, Agent, or Firm — Oblon, McClelland, Maier & Neustadt, L.L.P.

(57) ABSTRACT

Provided is a thermoplastic elastomer composition obtained by melt-kneading (A) an ethylene/α-olefin/non-conjugated polyene copolymer rubber that is a copolymer of ethylene, an α-olefin having 3 to 20 carbon atoms and a non-conjugated polyene, (B) a polyolefin resin and (C) a mineral oil-based softening agent in the presence of (D) a crosslinking agent, at least part of the ethylene/α-olefin/non-conjugated polyene copolymer rubber (A) being crosslinked, the thermoplastic elastomer composition having a sea-island structure in which the ethylene/α-olefin/non-conjugated polyene copolymer rubber (A) is dispersed as a dispersed phase (island phase) in a continuous phase (sea phase) of the polyolefin resin (B), and when a cross-section of the composition is observed with an atomic force microscope (AFM), a ratio of (b) a local elastic modulus of the continuous phase to (a) a local elastic modulus of the dispersed phase being from 10 to 30.

5 Claims, No Drawings

THERMOPLASTIC ELASTOMER COMPOSITION

CROSS-REFERENCE TO RELATED APPLICATION

Japanese Patent Application No. 2021-117716, filed on Jul. 16, 2021, and Japanese Patent Application No. 2021-198222, filed on Dec. 7, 2021, are hereby incorporated by reference in their entirety.

BACKGROUND OF THE INVENTION

The present invention relates to a thermoplastic elastomer composition.

There is known an olefin-based thermoplastic elastomer obtained by dynamically subjecting a composition formed of an ethylene-based copolymer and an α-olefin-based thermoplastic resin to heat treatment in the presence of a crosslinking agent (see, for example, JP-A-2014-193969). Molding processing using such olefin-based thermoplastic elastomer as a material does not require a vulcanization process in its production, and has an advantage in that a molding method for a general thermoplastic resin, such as injection molding, profile extrusion molding, calendering, or blow molding, can be adopted.

Meanwhile, such olefin-based thermoplastic elastomer has had a problem of being poor in rubber elasticity, that is, restorability at the time of deformation due to an external stress, as compared to a vulcanized rubber. In view of this, in order to solve such problem, an improvement has been made to the elastomer by a method involving, for example, increasing an amount of the crosslinking agent to improve a crosslink density of the ethylene-based copolymer, or raising a Mooney viscosity of the ethylene-based copolymer.

However, the above-mentioned method has had a problem in that a compression set characteristic is difficult to be decreased to a low level owing to decomposition of the α-olefin-based thermoplastic resin, or occurrence of dispersion failure of the α-olefin-based thermoplastic resin and the ethylene-based copolymer.

SUMMARY

Some aspects of the invention provide a thermoplastic elastomer composition having an excellent low-compression set characteristic. In addition, some aspects of the invention provide a thermoplastic elastomer composition also excellent in molding processability in addition to having an excellent low-compression set characteristic.

According to an aspect of the invention, there is provided a thermoplastic elastomer composition obtained by melt-kneading (A) an ethylene/α-olefin/non-conjugated polyene copolymer rubber that is a copolymer of ethylene, an α-olefin having 3 to 20 carbon atoms and a non-conjugated polyene, (B) a polyolefin resin, and (C) a mineral oil-based softening agent in the presence of (D) a crosslinking agent, at least part of the ethylene/α-olefin/non-conjugated polyene copolymer rubber (A) being crosslinked, the thermoplastic elastomer composition having a sea-island structure in which the ethylene/α-olefin/non-conjugated polyene copolymer rubber (A) is dispersed as a dispersed phase (island phase) in a continuous phase (sea phase) of the polyolefin resin (B), and when a cross-section of the thermoplastic elastomer composition is observed with an atomic force microscope (AFM), a ratio of (b) a local elastic modulus of the continuous phase to (a) a local elastic modulus of the dispersed phase being from 10 to 30.

DETAILED DESCRIPTION OF THE EMBODIMENT

The invention has been made to solve at least some of the above-mentioned problems, and can be implemented in the following embodiments.

According to an embodiment of the invention, there is provided a thermoplastic elastomer composition obtained by melt-kneading (A) an ethylene/α-olefin/non-conjugated polyene copolymer rubber that is a copolymer of ethylene, an α-olefin having 3 to 20 carbon atoms, and a non-conjugated polyene, (B) a polyolefin resin and (C) a mineral oil-based softening agent in the presence of (D) a crosslinking agent, at least part of the ethylene/α-olefin/non-conjugated polyene copolymer rubber (A) being crosslinked, the thermoplastic elastomer composition having a sea-island structure in which the ethylene/α-olefin/non-conjugated polyene copolymer rubber (A) is dispersed as a dispersed phase (island phase) in a continuous phase (sea phase) of the polyolefin resin (B), and when a cross-section of the thermoplastic elastomer composition is observed with an atomic force microscope (AFM), a ratio of (b) a local elastic modulus of the continuous phase to (a) a local elastic modulus of the dispersed phase being from 10 to 30.

In the thermoplastic elastomer composition, the local elastic modulus (b) of the continuous phase may be from 3 MPa to 90 MPa.

In the thermoplastic elastomer composition, a mass ratio of the mineral oil-based softening agent (C) to the ethylene/α-olefin/non-conjugated polyene copolymer rubber (A) may fall within a range of from 0.8 to 1.9.

In the thermoplastic elastomer composition, the crosslinking agent (D) may be an organic peroxide, and the thermoplastic elastomer composition may be obtained by further using (E) a polyfunctional compound.

In the thermoplastic elastomer composition, the polyolefin resin (B) may have a storage elastic modulus of from 200 MPa to 1,000 MPa, and the storage elastic modulus is determined by dynamic viscoelasticity measurement under conditions of a temperature of 30° C., a frequency of 1.00 Hz and a strain amount of 0.05%.

The thermoplastic elastomer composition according to the above embodiment provides an excellent low-compression set characteristic. In addition, the thermoplastic elastomer composition according to the above embodiment is also excellent in molding processability in addition to having an excellent low-compression set characteristic.

Preferred embodiments of the invention are described in detail below. It should be understood that the invention is not limited to the embodiments described below, and encompasses various modifications that can be implemented without departing from the scope of the invention.

Herein, a numerical range described with "from X to Y" is construed as including a numerical value X as a lower limit value and including a numerical value Y as an upper limit value.

As used herein, the term "ethylene/α-olefin/non-conjugated polyene copolymer rubber (A)" is sometimes abbreviated as "component (A)", the term "polyolefin resin (B)" is sometimes abbreviated as "component (B)", the term "mineral oil-based softening agent (C)" is sometimes abbreviated as "component (C)", the term "crosslinking agent (D)" is sometimes abbreviated as "component (D)", and the term "polyfunctional compound (E)" is sometimes abbreviated as "component (E)".

1. THERMOPLASTIC ELASTOMER COMPOSITION

According to an embodiment of the invention, there is provided a thermoplastic elastomer composition obtained by melt-kneading (A) an ethylene/α-olefin/non-conjugated polyene copolymer rubber that is a copolymer of ethylene, an α-olefin having 3 to 20 carbon atoms and a non-conjugated polyene, (B) a polyolefin resin, and (C) a mineral oil-based softening agent in a presence of (D) a crosslinking agent, at least part of the ethylene/α-olefin/non-conjugated polyene copolymer rubber (A) being crosslinked, the thermoplastic elastomer composition having a sea-island structure in which the ethylene/α-olefin/non-conjugated polyene copolymer rubber (A) is dispersed as a dispersed phase (island phase) in a continuous phase (sea phase) of the polyolefin resin (B), and when a cross-section of the composition is observed with an atomic force microscope (AFM), a ratio of (b) a local elastic modulus of the continuous phase to (a) a local elastic modulus of the dispersed phase being from 10 to 30.

In the thermoplastic elastomer composition according this embodiment, the local elastic modulus (b) of the continuous phase is preferably from 3 MPa to 90 MPa.

The thermoplastic elastomer composition according to this embodiment forms a sea-island structure with the component (A) serving as a dispersed phase and the component (B) serving as a continuous phase, and it has been revealed that its compression set characteristic with respect to deformation due to an external stress is improved by reducing a difference between the local elastic moduli of the two phases observed with an atomic force microscope. A reduction in difference between the local elastic moduli of the two phases can be achieved by increasing the local elastic modulus of the dispersed phase of the component (A) or reducing the local elastic modulus of the continuous phase of the component (B), or simultaneously satisfying both. A lower compression set value represents a better characteristic, and the compression set value is preferably 50% or less.

The above components contained in the thermoplastic elastomer composition according to this embodiment are described below.

1.1. Ethylene/α-Olefin/Non-conjugated Polyene Copolymer Rubber (A)

Examples of the ethylene/α-olefin/non-conjugated polyene copolymer rubber (A) to be used in this embodiment include random copolymers each using ethylene and an α-olefin having 3 to 10 carbon atoms as main components, such as an ethylene/propylene/non-conjugated diene terpolymer rubber and an ethylene/1-butene/non-conjugated diene terpolymer rubber.

Examples of the α-olefin having 3 to 10 carbon atoms may include propylene, 1-butene, 1-pentene, 3-methyl-1-butene, 1-hexene, 3-methyl-1-pentene, 4-methyl-1-pentene, 3-ethyl-1-pentene, 1-heptene, 1-octene, and 1-decene. Those α-olefins may be used alone or as a mixture thereof. Of those, propylene and 1-butene are particularly preferred.

Examples of the non-conjugated diene may include 1,4-pentadiene, 1,4-hexadiene, 1,5-hexadiene, 1,7-octadiene, 1,9-decadiene, 3,6-dimethyl-1,7-octadiene, 4,5-dimethyl-1,7-octadiene, 5-methyl-1,8-nonadiene, dicyclopentadiene, 5-ethylidene-2-norbornene, 5-vinyl-2-norbornene, and 2,5-norbornadiene. Those dienes may be used alone or as a mixture thereof. Of those, 1,4-hexadiene, dicyclopentadiene, and 5-ethylidene-2-norbornene are particularly preferred.

Specific examples of the component (A) include an ethylene/propylene/dicyclopentadiene terpolymer, an ethylene/propylene/5-ethylidene-2-norbornene terpolymer, and an ethylene/1-butene/5-ethylidene-2-norbornene terpolymer.

The content of ethylene in any such terpolymer is preferably from 47 mass % to 92 mass %, more preferably from 60 mass % to 90 mass % with respect to 100 mass % in total of the ethylene unit, the propylene or 1-butene unit, and the dicyclopentadiene or 5-ethylidene-2-norbornene unit. In addition, the content of propylene or 1-butene is preferably from 5 mass % to 50 mass %, more preferably from 10 mass % to 40 mass % with respect to 100 mass % in total of the ethylene unit, the propylene or 1-butene unit, and the dicyclopentadiene or 5-ethylidene-2-norbornene unit. When the content of ethylene in the terpolymer falls within the above-mentioned ranges, crosslinking efficiency tends to be improved, and hence the compression set characteristic can be decreased to a low level in some cases.

In addition, the content of dicyclopentadiene or 5-ethylidene-2-norbornene is preferably from 3 mass % to 10 mass %, more preferably from 3 mass % to 8 mass % with respect to 100 mass % in total of the ethylene unit, the propylene or 1-butene unit, and the dicyclopentadiene or 5-ethylidene-2-norbornene unit.

The limiting viscosity [q] of the ethylene/α-olefin/non-conjugated polyene copolymer rubber (A) when measured in a decalin solvent at 135° C. is preferably from 1 dl/g to 10 dl/g, more preferably from 2 dl/g to 10 dl/g, particularly preferably from 3 dl/g to 9 dl/g.

In addition, the polydispersity ratio (Mw/Mn) of the ethylene/α-olefin/non-conjugated polyene copolymer rubber (A) is preferably 5.0 or less, more preferably 4.5 or less, particularly preferably 4.0 or less. Here, Mw represents a weight average molecular weight, Mn represents a number average molecular weight, and Mw and Mn are values in terms of polystyrene measured by gel permeation chromatography (GPC).

The component (A) may be blended as an oil-extended rubber having the mineral oil-based softening agent (C) to be described later added thereto at the time of polymerization. When the component (A) is blended as an oil-extended rubber, the molding processability tends to be improved.

The content ratio of the component (A) in the thermoplastic elastomer composition according to this embodiment is preferably from 17 mass % to 50 mass %, more preferably from 20 mass % to 47 mass %, particularly preferably from 22 mass % to 44 mass % with respect to 100 mass % of the total amount of the component (A), the component (B), and the component (C).

1.2. Polyolefin Resin (B)

Examples of the polyolefin resin (B) to be used in this embodiment may include: polypropylene, a propylene/ethylene copolymer, a propylene/1-butene copolymer, a propylene/1-pentene copolymer, a propylene/3-methyl-1-butene copolymer, a propylene/1-hexene copolymer, a propylene/3-methyl-1-pentene copolymer, a propylene/4-methyl-1-pentene copolymer, a propylene/3-ethyl-1-pentene copolymer, a propylene/1-octene copolymer, a propylene/1-decene copolymer, and a propylene/1-undecene copolymer; homopolymers, such as atactic polypropylene and atactic poly-1-butene; a copolymer of propylene (at a content of 50 mol % or more) and another α-olefin (ethylene, 1-butene, 1-pentene, 1-hexene, 4-methyl-1-pentene, 1-octene, 1-decene, or the like); and a copolymer of 1-butene (at a content of 50 mol % or more) and another α-olefin (ethylene, propylene, 1-pentene, 1-hexene, 4-methyl-1-pentene, 1-octene, 1-decene, or the like). Those resins may be used alone or in combination thereof.

The storage elastic modulus of the polyolefin resin (B) to be used in this embodiment, which is determined by dynamic viscoelasticity measurement under the conditions of a temperature of 30° C., a frequency of 1.00 Hz, and a strain amount of 0.05%, is preferably from 200 MPa to 1,000 MPa, more preferably from 200 MPa to 850 MPa, particularly preferably from 200 MPa to 750 MPa. When the storage elastic modulus of the polyolefin resin (B) determined by dynamic viscoelasticity measurement falls within the above-mentioned ranges, the elastic modulus (b) of the continuous phase of the composition measured with an AFM is reduced, and hence the elastic modulus ratio (b)/(a) easily falls within the range of from 10 to 30, resulting in a tendency that the compression set characteristic can be decreased to a low level. As a dynamic viscoelasticity-measuring apparatus, there may be used, for example, a viscoelasticity-measuring apparatus RSA-GII (model) manufactured by TA Instruments.

In addition, the MFR of the polyolefin resin (B) measured in conformity with JIS K7210:2014 under the conditions of 230° C. and 21 N is preferably from 1 g/10 min to 150 g/10 min, more preferably from 2.5 g/10 min to 150 g/10 min, particularly preferably from 5 g/10 min to 150 g/10 min. When the MFR of the polyolefin resin (B) falls within the above-mentioned ranges, the composition is improved in fluidity, and hence is also improved in injection moldability, resulting in a tendency that molding appearance is improved.

The content ratio of the polyolefin resin (B) in the thermoplastic elastomer composition according to this embodiment is preferably from 8 mass % to 50 mass %, more preferably from 9 mass % to 40 mass %, particularly preferably from 10 mass % to 30 mass % with respect to 100 mass % of the total amount of the component (A), the component (B), and the component (C).

1.3. Mineral Oil-Based Softening Agent (C)

The mineral oil-based softening agent (C) to be used in this embodiment preferably has a molecular weight of from 300 to 2,000, particularly from 500 to 1,500 in terms of weight average molecular weight. A rubber softening agent formed of a mineral oil-based hydrocarbon is generally a three-component mixture of an aromatic ring, a naphthene ring, and a paraffin chain, and is classified as follows: one in which the number of carbon atoms of the paraffin chain accounts for 50% or more in the total number of carbon atoms is classified as a paraffin-based oil, one in which the number of carbon atoms of the naphthene ring accounts for from 30% to 45% in the total number of carbon atoms is classified as a naphthene-based oil, and one in which the number of carbon atoms of the aromatic ring accounts for 30% or more in the total number of carbon atoms is classified as an aromatic oil. In at least one embodiment of the invention, a paraffin-based one is preferred, and a hydrogenated paraffin-based one is particularly preferred. In addition, the mineral oil-based hydrocarbon preferably has a kinematic viscosity at 40° C. of from 20 cSt to 800 cSt, particularly from 50 cSt to 600 cSt, and a pour point of from −40° C. to 0° C., particularly from −30° C. to 0° C.

When the component (A) to be used in this embodiment is an oil-extended rubber, an extender oil contained in the oil-extended rubber also serves as the mineral oil-based softening agent (C).

With regard to its blending ratio, it is appropriate that the mineral oil-based softening agent (C) be blended so that a blending ratio of the mineral oil-based softening agent (C) to the ethylene/α-olefin/non-conjugated polyene copolymer rubber (A) may fall within the range of preferably from 0.8 to 1.9, more preferably from 0.9 to 1.8, particularly preferably from 1 to 1.7. When the blending ratio of the mineral oil-based softening agent (C) falls within the above-mentioned ranges, appropriate fluidity is imparted to the component (A), and besides, the occurrence of oil bleeding from the component (A) can be decreased.

1.4. Crosslinking Agent (D)

Examples of the crosslinking agent (D) to be used in this embodiment may include an organic peroxide, a phenol-based crosslinking agent, the polyfunctional compound (E), sulfur, a sulfur compound, p-quinone, a derivative of p-quinone dioxime, an epoxy compound, a silane compound, and an amino resin. Of those, any one kind of an organic peroxide or a phenol-based crosslinking agent, and the polyfunctional compound (E) are preferably used in combination, and an organic peroxide and the polyfunctional compound (E) are more preferably used in combination.

1.4.1. Organic Peroxide

Examples of the organic peroxide may include 1,3-di(tert-butylperoxyisopropyl)benzene, 2,5-dimethyl-2,5-di(tert-butylperoxy)hexyne-3, 2,5-dimethyl-2,5-di(tert-butylperoxy)hexene-3, 1,3-bis(tert-butylperoxyisopropyl)benzene, 2,5-dimethyl-2,5-di(tert-butylperoxy)hexane, 2,2-di(tert-butylperoxy)-p-isopropylbenzene, dicumyl peroxide, di-tert-butyl peroxide, tert-butyl peroxide, tert-butyl cumyl peroxide, p-menthane peroxide, 1,1-bis(tert-butylperoxy)-3,3,5-trimethylcyclohexane, dilauroyl peroxide, diacetyl peroxide, tert-butyl peroxybenzoate, 2,4-dichlorobenzoyl peroxide, p-chlorobenzoyl peroxide, benzoyl peroxide, di(tert-butylperoxy)perbenzoate, n-butyl-4,4-bis(tert-butylperoxy)valerate, and tert-butylperoxyisopropyl carbonate. Of those organic peroxides, dialkyl peroxides, such as 1,3-bis(tert-butylperoxyisopropyl)benzene, 2,5-dimethyl-2,5-di(tert-butylperoxy)hexyne-3, and 2,5-dimethyl-2,5-di(tert-butylperoxy)hexane, are preferred.

The blending ratio of the organic peroxide is preferably from 0.01 part by mass to 2.0 parts by mass, more preferably from 0.02 part by mass to 1.5 parts by mass with respect to 100 parts by mass in total of the component (A), the component (B), and the component (C) from the viewpoint of performing partial crosslinking that is uniform and mild.

1.4.2. Phenol-Based Crosslinking Agent

Examples of the phenol-based crosslinking agent may include a p-substituted phenol-based compound represented by the following general formula (1), an o-substituted phenol-aldehyde condensate, a m-substituted phenol-aldehyde condensate, and a brominated alkylphenol-aldehyde condensate. Of those, a p-substituted phenol-based compound is particularly preferred.

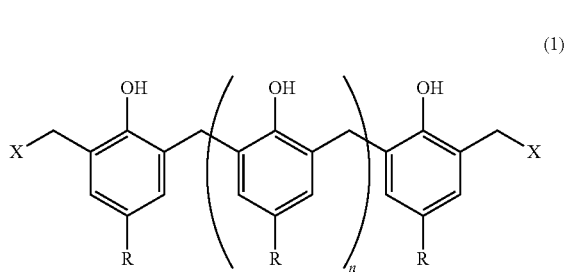

(1)

In the formula (1), "n" represents an integer of from 0 to 10, X represents at least any one of a hydroxyl group, a halogenated alkyl group, or a halogen atom, and R represents a saturated hydrocarbon group having 1 to 15 carbon atoms.

The p-substituted phenol-based compound is obtained through a condensation reaction between a p-substituted phenol and an aldehyde (preferably formaldehyde) in the presence of an alkali catalyst.

The blending ratio of the phenol-based crosslinking agent is preferably from 0.1 part by mass to 10 parts by mass, more preferably from 0.3 part by mass to 5 parts by mass, particularly preferably from 0.4 part by mass to 2 parts by mass with respect to 100 parts by mass in total of the component (A), the component (B), and the component (C) from the viewpoint of performing partial crosslinking that is uniform and mild.

When the phenol-based crosslinking agent is used, a crosslinking accelerator may be used in combination therewith. Examples of the crosslinking accelerator that may be used in combination with the phenol-based crosslinking agent include: metal halides, such as stannous chloride and ferric chloride; and organic halides, such as chlorinated polypropylene, brominated polypropylene, a brominated butyl rubber, and a chloroprene rubber. Further, other than the above-mentioned crosslinking accelerator, a metal oxide such as zinc oxide or a dispersant such as stearic acid may be used in combination.

1.4.3. Polyfunctional Compound (E)

In at least one embodiment of the invention, the "polyfunctional compound" refers to a low-molecular-weight compound having two or more non-conjugated carbon-carbon double bonds per molecule, the compound being capable of allowing a crosslinking reaction to efficiently proceed through combined use with another crosslinking agent free of such double bonds, to thereby express a uniform crosslinking structure and excellent rubber elasticity.

Examples of the polyfunctional compound (E) to be used in this embodiment include ethylene glycol di(meth)acrylate, diethylene glycol di(meth)acrylate, triethylene glycol di(meth)acrylate, tetraethyl ene glycol di(meth)acrylate, polyethylene glycol di(meth)acrylate, trimethylolpropane tri(meth)acrylate, diallyl phthalate, diallyl terephthalate, tetraallyloxyethane, triallyl cyanurate, N,N'-m-phenylene bismaleimide, N,N'-toluylene bismaleimide, bis(3-ethyl-5-methyl-4-maleimidophenyl)methane, divinylbenzene, and zinc di(meth)acrylate. Those polyfunctional compounds (E) may be used alone or in combination thereof.

In the case where an organic peroxide is used as the crosslinking agent (D), when the polyfunctional compound (E) having high reactivity to a free radical to be generated during the melt-kneading is used in combination therewith, the crosslinking reaction can quickly proceed to form a rubber domain having a high crosslink density, and besides, side reactions other than the crosslinking reaction of the free radical (e.g., a disproportionation reaction between free radical species, a hydrogen abstraction reaction that is not involved in the crosslinking reaction, and a β-elimination reaction involving the cleavage of the main chain of the copolymer rubber or the polyolefin resin) can be decreased.

The blending ratio of the polyfunctional compound (E) is preferably 3 parts by mass or less, more preferably from 0.1 part by mass to 1.5 parts by mass, particularly preferably from 0.2 part by mass to 1.2 parts by mass with respect to 100 parts by mass in total of the component (A), the component (B), and the component (C) from the viewpoint of maintaining the uniformity of the phase structure and the molding processability.

1.5. Other Additives

The thermoplastic elastomer composition according to this embodiment may be used, as required, by being blended with various additives, for example, a lubricant, a stabilizer, such as an anti-aging agent, a heat stabilizer, a weathering agent, a metal deactivator, a UV absorber, a light stabilizer, or a copper inhibitor, a bactericide/fungicide, a softening agent other than the mineral oil-based softening agent, a dispersant, a plasticizer, a crystal nucleating agent, a flame retardant, a silicone oil, a silicone polymer, a tackifier, a foaming aid, a colorant, such as titanium oxide or carbon black, metal powder such as ferrite, an inorganic fiber, such as a glass fiber or a metal fiber, an organic fiber, such as a carbon fiber or an aramid fiber, a composite fiber, an inorganic whisker such as a potassium titanate whisker, a filler, such as glass beads, glass balloons, glass flakes, asbestos, mica, calcium carbonate, talc, silica, calcium silicate, hydrotalcite, kaolin, diatomaceous earth, graphite, pumice stone, ebonite powder, cotton flocks, cork powder, barium sulfate, a fluorine resin, or polymer beads, or a mixture thereof, a filler, such as polyolefin wax, cellulose powder, rubber powder, or wood powder, or a low-molecular-weight polymer.

Any commonly used softening agent for a rubber is used as the softening agent other than the mineral oil-based softening agent without particular limitations, but examples thereof include plant oils (palm oil and the like), esters of fatty acids and higher alcohols (a phthalic acid diester and the like), phosphoric acid triesters, and low-molecular-weight hydrocarbons, such as a polybutene-based one and a polybutadiene-based one.

1.6. Measurement of Local Elastic Moduli with AFM

When a cross-section of the thermoplastic elastomer composition according to this embodiment is observed with an atomic force microscope (AFM), the ratio of the local elastic modulus (b) of the continuous phase to the local elastic modulus (a) of the dispersed phase is from 10 to 30, preferably from 11 to 30, more preferably from 12 to 30. When the ratio (b)/(a) falls within the above-mentioned ranges, the difference between the local elastic moduli of the continuous phase and the dispersed phase in the composition is reduced to make the balance between the elastic moduli of the continuous phase and the dispersed phase satisfactory, and hence an excellent low-compression set characteristic is obtained. When the ratio (b)/(a) is more than 30, the elastic modulus of the continuous phase is relatively high, and hence the composition is liable to become hard, resulting in a tendency that the compression set characteristic is increased.

The local elastic modulus (a) of the dispersed phase is preferably from 0.3 MPa to 5.0 MPa, more preferably from 0.3 MPa to 4.5 MPa, particularly preferably from 0.4 MPa to 4.0 MPa. When the local elastic modulus (a) of the dispersed phase falls within the above-mentioned ranges, the local elastic modulus difference with the continuous phase is easily reduced, and hence the balance between the elastic moduli of the continuous phase and the dispersed phase easily becomes satisfactory, resulting in a tendency that an excellent low-compression set characteristic is easily obtained.

The local elastic modulus (b) of the continuous phase is preferably from 3 MPa to 90 MPa, more preferably from 5 MPa to 85 MPa, particularly preferably from 8 MPa to 80 MPa. When the local elastic modulus (b) of the continuous phase falls within the above-mentioned ranges, the composition is likely to be soft, resulting in a tendency that an excellent low-compression set characteristic is easily obtained.

The local elastic moduli of the continuous phase and the dispersed phase in the thermoplastic elastomer composition according to this embodiment are obtained by observing a cross-section of the composition through use of an atomic force microscope (AFM). Specifically, the local elastic moduli were determined as described below. An obtained thermoplastic elastomer composition was cut in a state of being frozen to −120° C. so as to be perpendicular to an injection flow direction through use of an ultramicrotome (Leica EM FC7 (Leica Microsystems GmbH, Germany)) to provide a smooth surface suited for observation. Subsequently, in order to measure the local elastic moduli of the continuous phase and the dispersed phase in the cross-section, a force curve at each point in the observation range of 256×256 pixels was obtained using an atomic force microscope (Dimension XR (Bruker, USA)), which was mounted with a cantilever RTESPA-150 (Bruker, USA) having a nominal spring constant of 5 N/m, in the PeakForce QNM mode. For the analysis of the force curve, fitting was performed on the basis of the JKR two-point method through use of Bruker Nanoscope Analysis, and elastic modulus values were calculated to provide an elastic modulus mapping image of the observed surface. For the value of the elastic modulus of each phase used for the calculation of the local elastic modulus ratio, a median obtained when a histogram having a horizontal axis representing the elastic modulus was subjected to Gaussian fitting was determined as a representative value. In this case, the horizontal axis was on a logarithmic scale with base 10, and Igor Pro (HULINKS, Japan) software was used for fitting processing.

1.7. Molded Body and Applications

The thermoplastic elastomer composition according to this embodiment may be turned into a molded body using any of various molding methods, for example, injection molding methods, such as a gas injection molding method, an injection compression molding method, and a short-shot foaming method, an extrusion molding method, a blow molding method, and a compression molding method. Of those, an injection molding method is suitable. For example, when injection molding is performed, a molding temperature is generally from 130° C. to 280° C., preferably from 150° C. to 250° C. In addition, an injection pressure is generally from 5 MPa to 100 MPa, preferably from 10 MPa to 80 MPa. Meanwhile, a mold temperature is generally from 0° C. to 80° C., preferably from 20° C. to 60° C. After any such molding has been performed, the resultant molded body may be further subjected to a secondary process, such as laminate molding or thermoforming.

The thermoplastic elastomer composition according to this embodiment is suitable as a member for an automobile or a member for a building material, particularly a sealant for an automobile or a sealant for a building material. In addition, the thermoplastic elastomer composition according to this embodiment may be used in a wide range of fields, such as automobile parts (an airbag storage cover, a center panel, a center console box, a door trim, a pillar, an assist grip, a steering wheel, a weather strip, a ceiling material, an interior sheet, a bumper molding, a side molding, an air spoiler, an air duct hose, a cup holder, a side brake grip, a shift knob cover, a flapper door seal, a wire harness grommet, a rack and pinion boot, a suspension cover boot, a glass guide, an inner belt line seal, a roof guide, a trunk lid seal, a molded quarter wind gasket, a corner molding, a glass encapsulation, a hood seal, a glass run channel, a secondary seal, a body panel, a side shield, a door skin, a hose, a wire harness cover, a seat adjuster cover, various packings, and the like), civil engineering/construction parts (civil engineering materials and construction materials, such as a ground improvement sheet, a water barrier sheet, and a noise and vibration prevention wall, various civil engineering/construction gaskets and sheets, a water barrier material, a joint material, a window frame, a window frame packing, and the like), sanitary goods (a women's sanitary item, a disposable diaper, a grip for a toothbrush, and the like), sports goods (a grip for a golf club or a tennis racket, and the like), industrial parts (a medical container, a gasket, a packing, and the like), food parts (a container, a packing, and the like), medical instrument parts, electric wires, miscellaneous goods, and toys.

In addition, the thermoplastic elastomer composition according to this embodiment may be mixed with any other elastomer, thermoplastic resin, or additive in post-processing before use. Specific examples of the any other elastomer may include an olefin-based thermoplastic elastomer, a styrene-based thermoplastic elastomer, a urethane-based thermoplastic elastomer, an ester-based thermoplastic elastomer, and an amide-based thermoplastic elastomer. Specific examples of the any other thermoplastic resin may include an α-olefin resin, a cycloolefin resin, a polyamide resin, a polyester resin, a polyacetal resin, a polyphenylene ether resin, and a liquid crystal polymer. Specific examples of the any other additive include functional fillers (conductive carbon black, graphene, a carbon nanotube, a carbon fiber, a glass fiber, alumina, boron nitride, aluminum nitride, mica, clay, talc, metal particles, metal-coated particles, hollow particles, a microcapsule, and the like), a plasticizer, a tackifier, a colorant, and a masterbatch containing any thereof.

2. METHOD OF PRODUCING THERMOPLASTIC ELASTOMER COMPOSITION

The thermoplastic elastomer composition according to this embodiment is obtained by melt-kneading the ethylene/α-olefin/non-conjugated polyene copolymer rubber (A), the polyolefin resin (B), and the mineral oil-based softening agent (C) in the presence of the crosslinking agent (D). The "melt-kneading" in at least one embodiment of the invention refers to performing both of the application of a shear force and heating. When the component (A), the component (B), and the component (C) are melt-kneaded in the presence of the crosslinking agent (D), the thermoplastic elastomer composition having the sea-island structure in which the component (A) is dispersed as the dispersed phase (island phase) in the continuous phase (sea phase) of the component (B) is obtained.

As an apparatus capable of performing the melt-kneading, there may be given, for example, apparatus, such as an open-type mixing roll, a closed-type Banbury mixer, a kneader, a single-screw extruder, a co-rotating continuous twin-screw extruder, and a counter-rotating continuous twin-screw kneading machine. In addition, the treatment performed with such kneading apparatus may be performed in any one of a batch system or a continuous system.

The melt-kneading is preferably performed under a temperature condition within the range of from 150° C. to 250° C. from the viewpoint of a balance between the melting of the component (A) and the component (B), and the cross-linking reaction. The treatment time of the melt-kneading is not particularly limited, but is generally from 0.1 minute to 30 minutes when productivity and the like are taken into consideration.

3. EXAMPLES

The invention is further specifically described below by way of Examples. However, the invention is by no means limited to these Examples. The term "%" or "part(s)" in Examples and Comparative Examples is by mass unless otherwise indicated.

3.1. Materials Used (1) Ethylene/α-Olefin/Non-Conjugated Polyene Copolymer Rubbers Oil-extended ethylene/α-olefin/non-conjugated polyene copolymer rubbers OSR-1 to OSR-4 containing a mineral oil-based softening agent (manufactured by Idemitsu Kosan Co., Ltd., product name: "Diana Process Oil PW380") at ratios shown in Table 2 below with respect to ethylene/α-olefin/non-conjugated polyene copolymer rubbers shown in Table 1 below were used.

TABLE 1

| Ethylene/α-olefin/non-conjugated polyene copolymer rubber | | (A)-1 | (A)-2 |
|---|---|---|---|
| Ethylene/α-olefin/non-conjugated polyene copolymer rubber | Ethylene (parts by mass) | 67 | 69 |
| | Propylene (parts by mass) | 26.5 | 26.5 |
| | 5-Ethylidene-2-norbornene (parts by mass) | 6.5 | 4.5 |

TABLE 2

| | OSR-1 | OSR-2 | OSR-3 | OSR-4 |
|---|---|---|---|---|
| Oil-extended ethylene/α-olefin/non-conjugated polyene copolymer rubber | | | | |
| Ethylene/α-olefin/non-conjugated polyene copolymer rubber | (A)-1 | (A)-1 | (A)-1 | (A)-2 |
| Copolymer rubber (parts by mass) | 100 | 100 | 100 | 100 |
| Mineral oil-based softening agent (parts by mass) | 50 | 120 | 100 | 100 |

(2) Polyolefin Resin

Any of the following (B)-1, (B)-2, (B)-3, (B)-4, and (B)-5 was used as the polyolefin resin.

(B)-1: a mixture of 50 mass % of a product manufactured under the product name "NOVATEC PP FL02A" by Japan Polypropylene Corporation and 50 mass % of a product manufactured under the product name "L-MODU S400" by Idemitsu Kosan Co., Ltd.; MFR: 109 g/10 min, storage elastic modulus: 220 MPa (B)-2: a mixture of 70 mass % of a product manufactured under the product name "NOVATEC PP FL02A" by Japan Polypropylene Corporation and 30 mass % of a product manufactured under the product name "L-MODU S400" by Idemitsu Kosan Co., Ltd.; MFR: 35 g/10 min, storage elastic modulus: 380 MPa (B)-3: a product manufactured under the product name "NOVATEC PP MA3" by Japan Polypropylene Corporation; MFR: 11 g/10 min, storage elastic modulus: 1,800 MPa (B)-4: a mixture of 50 mass % of a product manufactured under the product name "WINTEC WMG03" by Japan Polypropylene Corporation and 50 mass % of a product manufactured under the product name "L-MODU S400" by Idemitsu Kosan Co., Ltd.; MFR: 160 g/10 min, storage elastic modulus: 320 MPa (B)-5: a mixture of 50 mass % of a product manufactured under the product name "WINTEC WMG03UX" by Japan Polypropylene Corporation and 50 mass % of a product manufactured under the product name "L-MODU S400" by Idemitsu Kosan Co., Ltd.; MFR: 160 g/10 min, storage elastic modulus: 350 MPa, WMG03UX contains a clarifying nucleating agent.

The storage elastic modulus is a value measured with a dynamic viscoelasticity-measuring apparatus (manufactured by TA Instruments, "RSA-GII") under the conditions of a temperature of 30° C., a frequency of 1.00 Hz, and a strain amount of 0.05%.

(3) Mineral Oil-Based Softening Agent (C): a product manufactured under the product name "Diana Process Oil PW380" by Idemitsu Kosan Co., Ltd.

(4) Crosslinking Agent (D): 2,5-dimethyl-2,5-di(tert-butylperoxy)hexane, a product manufactured under the product name "Perhexa 25B-40" by NOF Corporation (5) Polyfunctional Compound (E)-1: divinylbenzene, a product manufactured under the product name "Divinylbenzene (purity: 55 wt %)" by Sankyokasei Co., Ltd.

(E)-2: bis(3-ethyl-5-methyl-4-maleimidophenyl)methane, a product manufactured under the product name "BMI-5100" by Ouchi Shinko Chemical Industrial Co., Ltd.

(6) Anti-Aging Agent

Pentaerythritol tetrakis(3-(3,5-di-tert-butyl-4-hydroxyphenyl)propionate), a product manufactured under the product name "Irganox 1010" by BASF Japan Ltd.

3.2. Example 1

3.2.1. Production of Thermoplastic Elastomer Composition

55 Parts by mass of the oil-extended ethylene/α-olefin/non-conjugated polyene copolymer rubber OSR-1, 15 parts by mass of the polyolefin resin (B)-3, 30 parts by mass of the mineral oil-based softening agent (C) other than the mineral oil-based softening agent contained in OSR-1, and 0.1 part by mass of the anti-aging agent were loaded into a 10-liter double-arm type pressure kneader (manufactured by Nihon Spindle Manufacturing Co., Ltd.) that had been heated to 150° C., and were kneaded at 40 rpm for 20 minutes. After that, the composition in a molten state was pelletized with Feeder Ruder (manufactured by Nihon Spindle Manufacturing Co., Ltd.) set to 180° C. and 40 rpm. The resultant pelletized product was blended with 1.2 parts by mass of the crosslinking agent (D) and 0.8 part by mass of the polyfunctional compound (E)-1, and mixed therewith in a Henschel mixer for 30 seconds, and the mixture was extruded while being subjected to melt-kneading treatment under the conditions of staying for 2 minutes at 230° C. and 500 rpm through use of a twin-screw extruder (manufactured by Kobe Steel, Ltd., model: "HYPERKTX 30", co-rotating and fully intermeshing screws, having a ratio L/D between screw flight length L and screw diameter D of 74) to provide a pellet-shaped thermoplastic elastomer composition.

3.2.2. Measurement of Local Elastic Moduli of Continuous Phase and Dispersed Phase The local elastic moduli of a continuous phase and a dispersed phase in the thermoplastic elastomer composition obtained above were determined by observing a cross-section of the composition through use of an atomic force microscope (AFM). Specifically, the local elastic moduli were determined as described below. The obtained thermoplastic elastomer composition was cut in a state of being frozen to −120° C. so as to be perpendicular to an injection flow direction through use of an ultramicrotome (Leica EM FC7 (Leica Microsystems GmbH, Germany)) to provide a smooth surface suited for observation. Subsequently, in order to measure the local elastic moduli of the continuous phase and the dispersed phase in the cross-section, a force curve at each point in the observation range of 256×256 pixels was obtained using an atomic force microscope (Dimension XR (Bruker, USA)), which was mounted with a cantilever RTESPA-150 (Bruker, USA) having a nominal spring constant of 5 N/m, in the PeakForce QNM mode. For the analysis of the force curve, fitting was performed on the basis of the JKR two-point method through use of Bruker Nanoscope Analysis, and elastic modulus values were calculated to provide an elastic modulus mapping image of the observed surface. For the value of the elastic modulus of each phase used for the calculation of a local elastic modulus ratio, a median obtained when a histogram having a horizontal axis representing the elastic modulus was subjected to Gaussian fitting was determined as a representative value. In this case, the horizontal axis was on a logarithmic scale with base 10, and Igor Pro (HULINKS, Japan) software was used for fitting processing.

3.2.3. Evaluation Method

The obtained pellet-shaped thermoplastic elastomer composition was used and evaluated for its MFR by the following method.

(1) MFR

The melt flow rate (MFR) was measured in conformity with JIS K7210:2014 under the conditions of a temperature of 230° C. and a load of 21.2 N (2.16 kg). The resultant measured value was adopted as an evaluation value for fluidity.

Then, a flat plate measuring 120 mm×120 mm×2 mm (length×width×thickness) was injection-molded using an injection molding machine having a clamping force of 110 tons (manufactured by The Japan Steel Works, LTD., product name: "J-110AD") to provide a test piece. The resultant test piece was evaluated for its compression set, hardness, tensile strength, maximum elongation, and molding appearance.

(2) Compression Set

An indicator of elastic recoverability, a compression set at the time of 25% compression at 70° C. for 22 hours was measured in conformity with JIS K6262:2013. As the value of the compression set becomes lower, the elastic recoverability may be judged to be better.

(3) Hardness (Duro-A)

Measurement was performed in conformity with JIS 1(6253-3:2012 (Duro-A).

(4) Tensile Test

The tensile strength (TB) and the maximum elongation (EB) were measured in conformity with JIS K6251:2017.

(5) Molding Appearance

The test piece obtained above was evaluated for a sink mark, burning, and a flow mark on the following two-point scale.

(Evaluation Criteria)

A: The molding appearance is excellent without any of a sink mark, burning, and a flow mark.

B: The molding appearance is poor with the occurrence of the phenomenon of any one of a sink mark, burning, and a flow mark.

(6) Thermal Fusibility with Vulcanized EPDM

<Manufacture of Joined Body>

100 Parts by mass of an ethylene/propylene/5-ethylidene-2-norbornene terpolymer (product name: "EP 57C", manufactured by JSR Corporation), 120 parts by mass of carbon black (product name: "SEAST SO", manufactured by Tokai Carbon Co., Ltd.), 50 parts by mass of calcium carbonate (product name: "SUPER SSS", arithmetic average particle diameter: 1.8 μm, manufactured by Maruo Calcium Co., Ltd.), 70 parts by mass of a paraffin-based process oil (product name: "PW90", manufactured by Idemitsu Kosan Co., Ltd.), 5 parts by mass of active zinc oxide (manufactured by Sakai Chemical Industry Co., Ltd.), and 1 part by mass of stearic acid (manufactured by ADEKA Corporation) were mixed using a Banbury mixer under the conditions of 50° C., 70 rpm, and 2.5 minutes to provide a mixture. To the whole amount (346 parts by mass) of the resultant mixture, 10 parts by mass of a dehydrating agent (product name: "VESTA-PP", manufactured by Inoue Calcium Corporation), 0.6 part by mass of a vulcanization accelerator available under the product name "NOCCELER M-P", 0.5 part by mass of a vulcanization accelerator available under the product name "NOCCELER CZ-G", 1.2 parts by mass of a vulcanization accelerator available under the product name "NOCCELER TT-P", and 2 parts by mass of a vulcanization accelerator available under the product name "NOCCELER BZ-P" (all of the vulcanization accelerators were manufactured by Ouchi Shinko Chemical Industrial Co., Ltd.), and 2 parts by mass of sulfur were added, and the resultant was kneaded at 50° C. using an open roll, followed by vulcanization at 170° C. for 10 minutes to provide a vulcanized rubber sheet measuring 120 mm×120 mm×2 mm (length×width×thickness). The sheet was punched using a dumbbell cutter to a length of 60 mm and a width of 50 mm to provide a molded body (I). Next, the thermoplastic elastomer composition was injection-molded into a split mold so as to fit into a vacant portion (in the split mold having attached thereto the molded body (I)) under the conditions of a cylinder temperature of 250° C., a mold temperature of 50° C., and an injection rate of 50 cm$^3$/sec to provide a joined body (120 mm×120 mm×2 mm (length×width×thickness)) in which a molded body (II) derived from the thermoplastic elastomer and the molded body (I) were joined to each other.

<Evaluation of Fusibility>

The resultant joined body was punched with a JIS-No. 3 dumbbell cutter to produce a test piece (dumbbell-shaped test piece) for vulcanized rubber adhesive property evaluation. In this case, the above-mentioned flat plate was punched so that an injection-fused surface (surface in which the molded body (I) and the molded body (II) were fused by injection) was located between gauge marks and was perpendicular to the length direction of the dumbbell, to thereby produce a sample piece for fusibility evaluation. The resultant sample piece was repeatedly folded on the front and back by 180° C. along the injection-fused surface, and fusibility was evaluated from the number of folds required for peeling.

3.3. Examples 2 to 10 and Comparative Examples 1 to 4

Pellet-shaped thermoplastic elastomer compositions and test pieces were produced in the same manner as in Example 1 at ratios shown in Table 3 below, and were evaluated in the same manner as in Example 1.

3.4. Evaluation Results

Table 3 below shows the compositions of the thermoplastic elastomer compositions of Examples and Comparative Examples, and the evaluation results.

TABLE 3

|  |  | Examples |  |  |  |  |  |  |
|---|---|---|---|---|---|---|---|---|
|  |  | 1 | 2 | 3 | 4 | 5 | 6 | 7 |
| Oil-extended ethylene/α-olefin/ non-conjugated polyene copolymer rubber | OSR-1 | 55 |  | 63 | 70 |  |  |  |
|  | OSR-2 |  | 85 |  |  |  |  | 85 |
|  | OSR-3 |  |  |  |  | 85 |  |  |
|  | OSR-4 |  |  |  |  |  | 85 |  |
| Polyolefin resin | (B)-1 |  | 15 | 15 | 15 | 15 |  | 15 |
|  | (B)-2 |  |  |  |  |  | 15 |  |
|  | (B)-3 | 15 |  |  |  |  |  |  |
|  | (B)-4 |  |  |  |  |  |  |  |
|  | (B)-5 |  |  |  |  |  |  |  |
| Mineral oil-based softening agent (added portion) | (C) | 30 |  | 22 | 15 |  |  |  |
| Crosslinking agent | (D) | 1.2 | 1.2 | 1.2 | 1.2 | 1.2 | 1.2 | 1.2 |
| Polyfunctional compound | (E)-1 | 0.8 | 0.8 | 0.8 | 0.8 | 0.8 | 0.8 |  |
|  | (E)-2 |  |  |  |  |  |  | 0.8 |
| Anti-aging agent |  | 0.1 | 0.1 | 0.1 | 0.1 | 0.1 | 0.1 | 0.1 |
| Ethylene/α-olefin/ conjugated polyene copolymer rubber | (A)-1 | 36.7 | 38.6 | 42 | 46.7 | 42.5 |  | 38.6 |
|  | (A)-2 |  |  |  |  |  | 42.5 |  |
| Mineral oil-based softening agent (total) | (C) | 48.3 | 46.4 | 43 | 38.3 | 42.5 | 42.5 | 46.4 |
| Ratio of local elastic modulus (b) of continuous phase to local elastic modulus (a) of dispersed phase |  | 28.6 | 27.6 | 14.8 | 12.5 | 19.2 | 29.6 | 27.8 |
| Local elastic modulus (b) [MPa] of continuous phase |  | 80 | 47 | 43 | 45 | 50 | 74 | 50 |
| Local elastic modulus (a) [MPa] of dispersed phase |  | 2.8 | 1.7 | 2.9 | 3.6 | 2.6 | 2.5 | 1.8 |
| Mass ratio of component (C) to component (A) |  | 1.32 | 1.20 | 1.02 | 0.82 | 1.00 | 1.00 | 1.20 |
| Evaluation results | Compression set [%] | 38 | 33 | 35 | 31 | 38 | 37 | 35 |
|  | Hardness [—] | 66 | 50 | 52 | 58 | 55 | 60 | 51 |
|  | Tensile strength $T_B$ [MPa] | 5.2 | 5.2 | 5.7 | 5.4 | 5.4 | 5.2 | 5.5 |
|  | Maximum elongation $E_B$ [%] | 710 | 700 | 720 | 650 | 730 | 690 | 770 |
|  | Fluidity (MFR) [g/10 min] | 12 | 3.8 | 10 | 6.0 | 2.2 | 2.0 | 4.3 |
|  | Molding appearance | A | A | A | A | A | A | A |
|  | Thermal fusibility with vulcanized EPDM [folds] | 25 | 25 | 24 | 22 | 24 | 28 | 28 |

|  |  | Examples |  |  | Comparative Examples |  |  |  |
|---|---|---|---|---|---|---|---|---|
|  |  | 8 | 9 | 10 | 1 | 2 | 3 | 4 |
| Oil-extended ethylene/α-olefin/ non-conjugated polyene copolymer rubber | OSR-1 |  |  |  | 85 |  | 45 | 56 |
|  | OSR-2 | 90 | 90 | 90 |  | 85 |  |  |
|  | OSR-3 |  |  |  |  |  |  |  |
|  | OSR-4 |  |  |  |  |  |  |  |
| Polyolefin resin | (B)-1 | 10 |  |  |  |  | 15 | 25 |
|  | (B)-2 |  |  |  |  |  |  |  |
|  | (B)-3 |  |  |  | 15 | 15 |  |  |
|  | (B)-4 |  | 10 |  |  |  |  |  |
|  | (B)-5 |  |  | 10 |  |  |  |  |
| Mineral oil-based softening agent (added portion) | (C) |  |  |  |  |  | 40 | 19 |
| Crosslinking agent | (D) | 1.2 | 1.2 | 1.2 | 1.2 | 1.2 | 1.2 | 1.2 |
| Polyfunctional compound | (E)-1 | 0.8 | 0.8 | 0.8 | 0.8 | 0.8 | 0.8 | 0.8 |
|  | (E)-2 |  |  |  |  |  |  |  |
| Anti-aging agent |  | 0.1 | 0.1 | 0.1 | 0.1 | 0.1 | 0.1 | 0.1 |
| Ethylene/α-olefin/ conjugated polyene copolymer rubber | (A)-1 | 40.9 | 40.9 | 40.9 | 56.7 | 38.6 | 30 | 37.3 |
|  | (A)-2 |  |  |  |  |  |  |  |
| Mineral oil-based softening agent (total) | (C) | 49.1 | 49.1 | 49.1 | 28.3 | 46.4 | 55 | 37.7 |

TABLE 3-continued

| | | | | | | | | |
|---|---|---|---|---|---|---|---|---|
| Ratio of local elastic modulus (b) of continuous phase to local elastic modulus (a) of dispersed phase | | 20.0 | 20.0 | 22.0 | 32.5 | 67.6 | 7.9 | 31.3 |
| Local elastic modulus (b) [MPa] of continuous phase | | 8 | 10 | 11 | 130 | 115 | 22 | 94 |
| Local elastic modulus (a) [MPa] of dispersed phase | | 0.4 | 0.5 | 0.5 | 4.0 | 1.7 | 2.8 | 3.0 |
| Mass ratio of component (C) to component (A) | | 1.20 | 1.20 | 1.20 | 0.50 | 1.20 | 1.83 | 1.01 |
| Evaluation results | Compression set [%] | 19 | 19 | 20 | 43 | 46 | 42 | 50 |
| | Hardness [—] | 40 | 41 | 42 | 85 | 63 | 45 | 80 |
| | Tensile strength $T_B$ [MPa] | 2.8 | 2.9 | 3.0 | 5.1 | 9.1 | 4.5 | 6.5 |
| | Maximum elongation $E_B$ [%] | 470 | 460 | 450 | 510 | 720 | 610 | 700 |
| | Fluidity (MFR) [g/10 min] | 4.3 | 4.8 | 4.6 | <0.1 | 2.0 | 33 | 15 |
| | Molding appearance | A | A | A | B | A | B | A |
| | Thermal fusibility with vulcanized EPDM [folds] | 21 | 20 | 25 | 15 | 24 | 19 | 25 |

It was found from the evaluation results of Table 3 above that the thermoplastic elastomer compositions of Examples 1 to 10 were particularly superior in terms of low-compression set characteristic to the thermoplastic elastomer compositions of Comparative Examples 1 to 4.

The invention is not limited to the embodiments described above, and various modifications may be made thereto. The invention includes configurations that are substantially the same (for example, in functions, methods, and results, or in objectives and effects) as the configurations described in the embodiments. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Although the embodiments of the invention have been described in detail above, those skilled in the art would readily appreciate that many modifications are possible in the embodiments without materially departing from the novel teachings and effects of the invention. Accordingly, all such modifications are intended to be included within the scope of the invention.

What is claimed is:

1. A thermoplastic elastomer composition obtained by melt-kneading (A) an ethylene/α-olefin/non-conjugated polyene copolymer rubber that is a copolymer of ethylene, an α-olefin having 3 to 20 carbon atoms and a non-conjugated polyene, (B) a polyolefin resin and (C) a mineral oil-based softening agent in a presence of (D) a crosslinking agent,
   at least part of the ethylene/α-olefin/non-conjugated polyene copolymer rubber (A) being crosslinked,
   the thermoplastic elastomer composition having a sea-island structure in which the ethylene/α-olefin/non-conjugated polyene copolymer rubber (A) is dispersed as a dispersed phase (island phase) in a continuous phase (sea phase) of the polyolefin resin (B), and
   when a cross-section of the thermoplastic elastomer composition is observed with an atomic force microscope (AFM), a ratio of (b) a local elastic modulus of the continuous phase to (a) a local elastic modulus of the dispersed phase being from 10 to 30.

2. The thermoplastic elastomer composition according to claim 1, wherein the local elastic modulus (b) of the continuous phase is from 3 MPa to 90 MPa.

3. The thermoplastic elastomer composition according to claim 1, wherein a mass ratio of the mineral oil-based softening agent (C) to the ethylene/α-olefin/non-conjugated polyene copolymer rubber (A) falls within a range of from 0.8 to 1.9.

4. The thermoplastic elastomer composition according to claim 1, wherein the crosslinking agent (D) is an organic peroxide, and the thermoplastic elastomer composition is obtained by further using (E) a polyfunctional compound.

5. The thermoplastic elastomer composition according to claim 1, wherein the polyolefin resin (B) has a storage elastic modulus of from 200 MPa to 1,000 MPa, and the storage elastic modulus is determined by dynamic viscoelasticity measurement under conditions of a temperature of 30° C., a frequency of 1.00 Hz and a strain amount of 0.05%.

* * * * *